United States Patent
Brotz

[11] Patent Number: 5,502,623
[45] Date of Patent: Mar. 26, 1996

[54] ILLUMINATED CLIPBOARD

[76] Inventor: Gregory R. Brotz, P.O. Box 1322, Sheboygan, Wis. 53081

[21] Appl. No.: 463,764

[22] Filed: Jun. 5, 1995

[51] Int. Cl.⁶ .................................................... F21V 33/00
[52] U.S. Cl. .................. 362/99; 362/31; 362/27
[58] Field of Search .................. 362/26, 27, 31, 362/98, 99, 253

[56] References Cited

U.S. PATENT DOCUMENTS

| | | | |
|---|---|---|---|
| 1,320,537 | 11/1919 | Dimond | 362/99 |
| 5,163,748 | 11/1992 | Messinger | 362/98 |
| 5,280,415 | 1/1994 | Barnette | 362/99 |

Primary Examiner—Stephen F. Husar
Attorney, Agent, or Firm—William Nitkin

[57] ABSTRACT

An illuminated clipboard having a transparent body with a light-emitting, light-diffusing upper surface and a curved bottom surface wherein the bottom surface curves upward at its sides to meet the top surface with a light source disposed within the transparent body of the clipboard to reflect light off the curved bottom which causes the light within the transparent body of the clipboard to be reflected off the bottom surface to the light-emitting, light-diffusing upper surface to illuminate what is positioned on the light-emitting, light-diffusing upper surface of the clipboard.

2 Claims, 2 Drawing Sheets

ILLUMINATED CLIPBOARD

BACKGROUND OF THE INVENTION

1. Field of the Invention

The structure of this invention resides in the area of clipboards and more particularly relates to an illuminated clipboard which has a source of light under its top surface to shine through paper or other objects placed thereon so that indicia such as writing on such paper is visible to the user of the clipboard when such clipboard is used in low ambiant light situations or in total darkness.

2. Description of the Prior Art

The concept of illuminating clipboards is known in the prior art. Applicant's prior invention in the field, U.S. Pat. No. 5,381,310 disclosed a clipboard with a luminescent sheet disposed under the usable writing area of the clipboard. Other patents in the field also disclose writing surfaces with illumination means.

SUMMARY OF THE INVENTION

It is an object of this invention to provide a new and improved illuminated clipboard with a unique integral structure. The clipboard is made of a transparent, light-transmitting plastic material having a light-emitting or light-diffusing top surface and a curved, inwardly reflecting rear surface to cause internal reflections of light coming from a light source embedded in the transparent plastic to illuminate the top surface. In producing such clipboard, it is an object of this invention that there be no sharp edges at the meeting points of the curved rear surface of the board with the flat front surface of the board to avoid creating a second light-emitting surface. When molding the material for such clipboard, which material can be light-transmitting polymers, the mold surfaces can be highly polished. A smooth, highly polished amorphous surface can be produced on such thermo-plastic molded member from such molds. The amorphous surface is caused by the molten polymer being "frozen" in an amorphous state immediately upon contacting the mold surface while the interior of the molded part cools more slowly, allowing the interior polymer regions to crystallize. The smooth amorphous exterior surfaces act as reflectors to any internally transmitted light which is substantially reflected inward by such surfaces. To increase further the reflectiveness of the curved rear surface, a reflective backing can be placed thereagainst or a white coating can be painted thereon. Light within the transparent body of the clipboard reflects off the reflective exterior rear surface to strike and be dispersed on the roughened or "ground" light-diffusing upper surface to illuminate the upper surface sufficiently so that if paper is placed thereon, the upper surface of the paper will be visible to read printing thereon and the user will be able, if desired, to write on that surface in low light situations or in darkness. If the clipboard is molded and initially has a smooth, amorphous upper surface, such upper surface can be toughened or textured as described below which process will remove the smooth amorphous layer of the upper surface.

DESCRIPTION OF THE PREFERRED EMBODIMENT(S)

Figure 1:
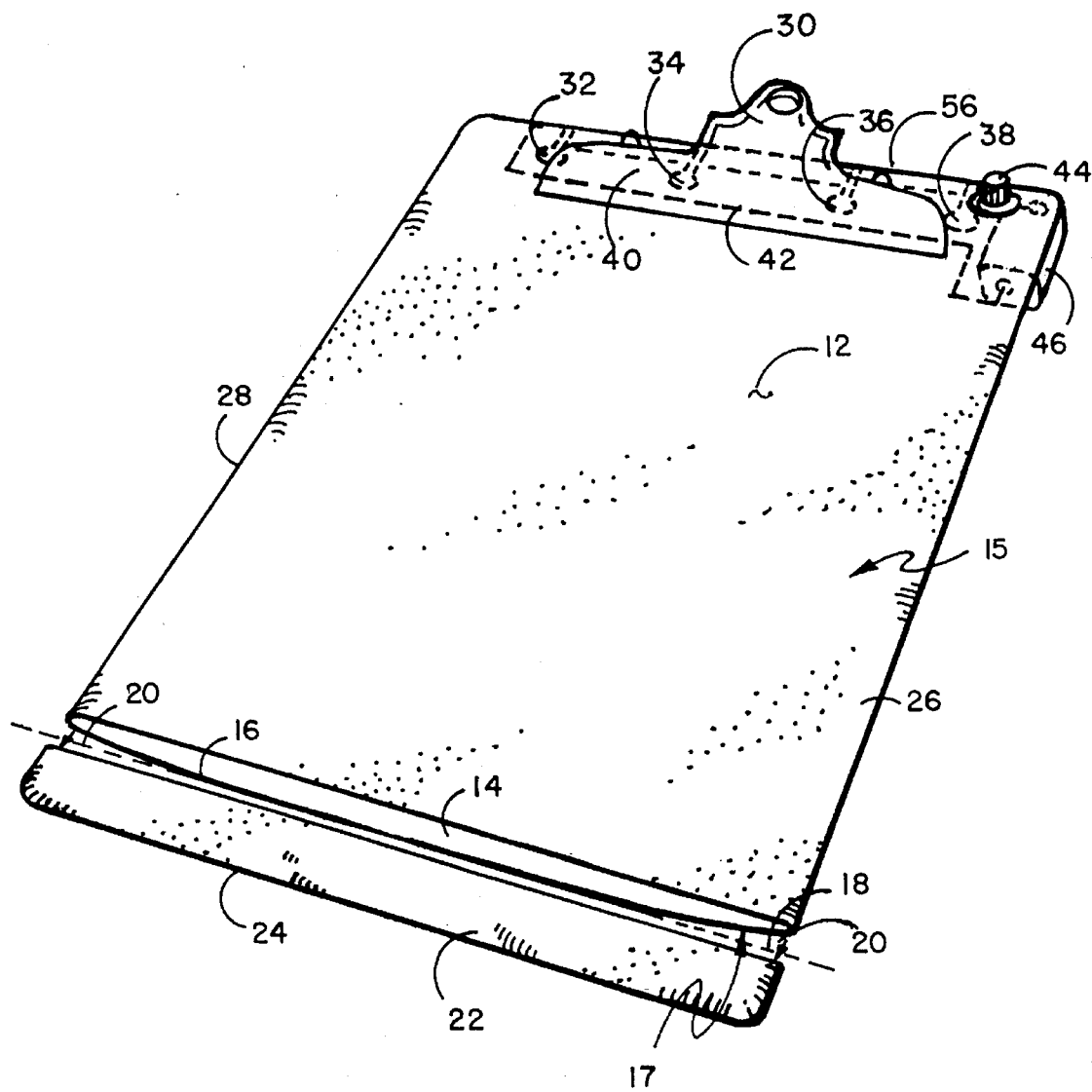
FIG. 1 illustrates a perspective view of the illuminated clipboard of this invention with the lower portion shown separated therefrom, displaying a cross-sectional area through the clipboard.
Figure 2:
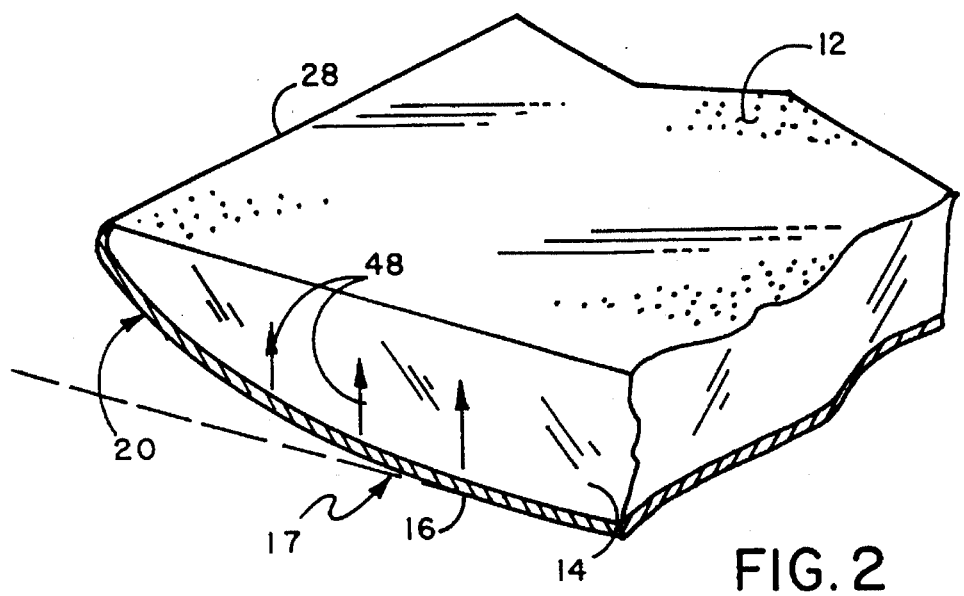
FIG. 2 illustrates a perspective view of a sectional portion of an edge of the clipboard.

FIG. 1 illustrates clipboard 10 having a light-diffusing upper surface 12 which can be roughened. The roughening of upper surface 12 can be done, for example, by sandblasting transparent plastic body 15 which can be an acrylic material or equivalent. Acid or solvent etching will also produce such "ground" effect as in a ground glass focusing screen. Upper surface 12 of clipboard 10 can also be toughened by cryogenic sandblasting wherein small brittle fractures will create such roughened surface which will disperse more light coming thereto from below than a surface created by traditional sandblasting. Cryogenic sandblasting produces the sharpest etching on the roughened portions, but acid or solvent etching or other types of sandblasting, such as sandblasting with dry ice, will also create a similar ground glass-type surface for the light diffusion of the top surface. The body of clipboard 10 has a curved bottom exterior 17 which extends top to bottom and side to side such that bottom exterior 17 curves up to meet the clipboard side edges 24, 26, 28 and 56. In FIG. 2 bottom exterior 17 is seen curving up at angle arch 20 to meet edge 28 at surface 12. Disposed on bottom exterior 17 of transparent clipboard 10 can be layer 16 which can be a coating of white or silver paint or even a sheet of white or other reflective material which layer helps cause light that shines within body 14 of the clipboard to be reflected upward toward light-emitting and light-diffusing upper surface 12. As seen in FIG. 1 a light source can be provided such as a plurality of LEDs 32, 34, 36 and 38 interconnected by wires in series 40 and 42 running to battery 46 which is disposed on the clipboard and activated by switch 44. The light source is embedded directly into body 14 of transparent material of the clipboard and when activated, directs light to shine through the entire clipboard's transparent body 14. Apertures can also be drilled into the light-transmitting polymer into which light-emitting elements can be inserted. Apertures that are molded into the clipboard will not work well because reflective surfaces will be created. In an alternate embodiment LEDs can be directly entered into the polymer material while the clipboard is being molded which process can have many advantages in improving the transmission of light thereof and in reducing the cost of manufacture of the clipboard. The light reflects, as seen by reflecting arrows 48 in FIG. 2, from reflective layer 16 at bottom exterior 17 to light-emitting and light-diffusing upper surface 12 such that upper surface 12 is illuminated and projects light dispersed therethrough to then shine through any paper or other translucent object disposed on the clipboard.

In FIG. 1 the lower section of the clipboard is shown cut away and separated somewhat therefrom for illustrative purposes. Bottom exterior 17 of clipboard 10 can curve upwards to meet the top surface at each side edge, such as rounded side edges 26 and 28 as well as side edge 24 of segment 22 and side edge 56. The curved bottom exterior not only acts as a concave reflector but also prevents escape of light where its sides meet the upper surface such as might occur if the bottom surface were flat and parallel to the upper surface, thus creating flat side edges from which light could escape. In this manner the light source embedded in transparent body 14 is efficiently reflected therein and emanates only out of upper surface 12 using internal reflections to increase the light level on the working surface of the clipboard.

Figure 3:
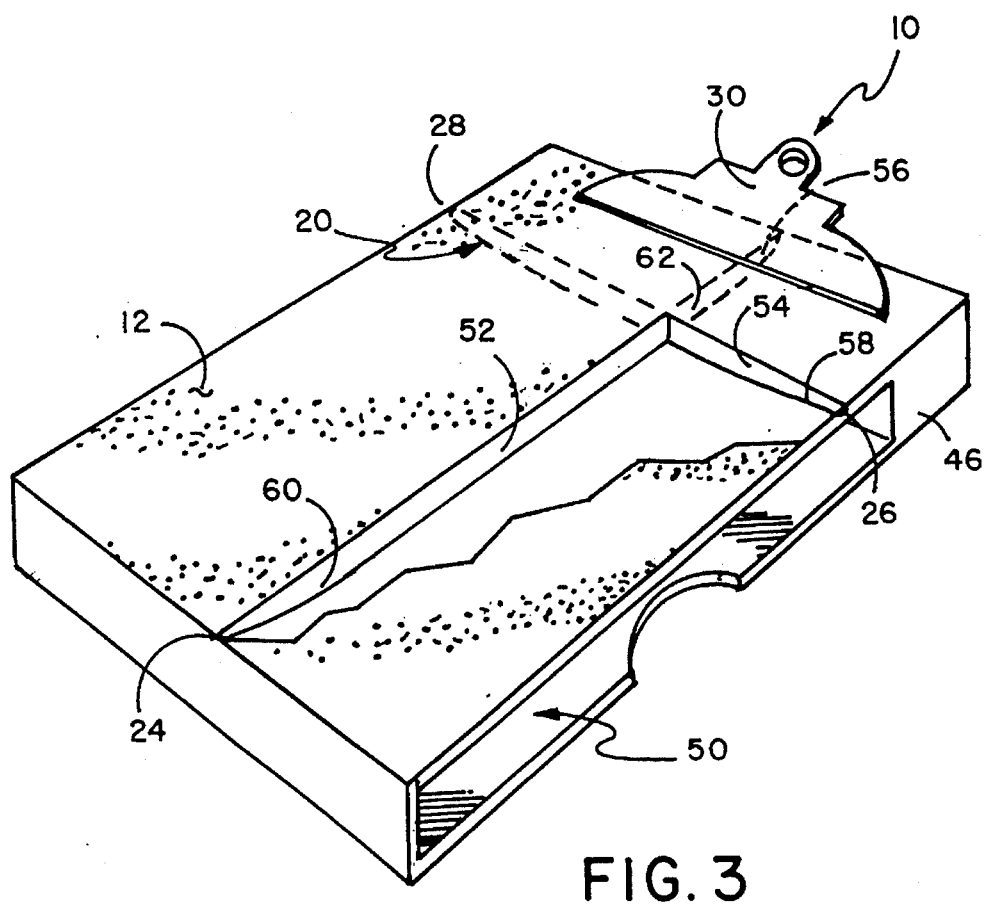
FIG. 3 illustrates a perspective view with sections cut away to show the clipboard's internal structure with a pocket formed therebelow.

FIG. 3 illustrates a perspective view of clipboard 10 with portions cut away to show the molded bottom of the clipboard curving upwards at side edges 24, 26, 28 and 56 to meet upper surface 12. A reflective layer 16 can be disposed on the curved surface of bottom exterior 17 which is seen curving upwards at angle arches 20, 60, 62 and 58 to meet upper surface 12, respectively, at side edges 28, 24, 56 and 26. As seen in FIG. 3, cutaway sections 52 and 54 help to illustrate such curvature of the bottom surface. Clip 30 is seen in its traditional position on upper surface 12 of the clipboard, but the bottom of the clipboard can include a battery 46 and a lower paper receipt area 50 disposed under the curved surface of the clipboard into which paper or other materials can be inserted.

Although the present invention has been described with reference to particular embodiments, it will be apparent to those skilled in the art that variations and modifications can be substituted therefor without departing from the principles and spirit of the invention.

I claim:

1. An improved clipboard comprising:

a transparent body having an upper surface and a bottom surface, said upper surface having a plurality of sides and said bottom surface having a plurality of curved sides, said upper surface being light-emitting and light-diffusing, said curved sides of said bottom surface rising upwards to meet said sides of said upper surface;

means for said bottom surface to act as a reflector; and a light source having an "on" and an "off" mode, said light source embedded within said transparent body, said light source in its "on" mode directing its light within said transparent body of said clipboard to be reflected off said reflective bottom surface and out said light-emitting and light-diffusing upper surface.

2. The clipboard of claim 1 further including:

a layer of reflective material disposed on said bottom surface.

\* \* \* \* \*